(12) United States Patent
Ohashi

(10) Patent No.: US 10,076,956 B2
(45) Date of Patent: Sep. 18, 2018

(54) GAS TANK-EQUIPPED VEHICLE

(71) Applicant: TOYOTA JIDOSHA KABUSHIKI KAISHA, Toyota-shi, Aichi-ken (JP)

(72) Inventor: Yasuhiko Ohashi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 14 days.

(21) Appl. No.: 15/433,424

(22) Filed: Feb. 15, 2017

(65) Prior Publication Data

US 2017/0240045 A1 Aug. 24, 2017

(30) Foreign Application Priority Data

Feb. 18, 2016 (JP) ................................. 2016-029204

(51) Int. Cl.
*B60K 28/14* (2006.01)
*B60K 15/07* (2006.01)
*B60K 15/067* (2006.01)

(52) U.S. Cl.
CPC .............. *B60K 28/14* (2013.01); *B60K 15/07* (2013.01); *B60K 2015/0675* (2013.01); *B60Y 2306/01* (2013.01)

(58) Field of Classification Search
CPC B60K 28/14; B60K 15/07; B60K 2015/0675; B60Y 2306/01
See application file for complete search history.

(56) References Cited

U.S. PATENT DOCUMENTS

2010/0252353 A1  10/2010  Tsubokawa

FOREIGN PATENT DOCUMENTS

| DE | 10 2009 039 079 A1 | 3/2011 |
|---|---|---|
| JP | 2002-046484 A | 2/2002 |
| JP | 2006-123590 | 5/2006 |
| JP | 2009-101866 A | 5/2009 |
| JP | 2014-159817 A | 9/2014 |
| JP | 2014-213817 | 11/2014 |

*Primary Examiner* — D Glenn Dayoan
*Assistant Examiner* — Melissa A Black
(74) *Attorney, Agent, or Firm* — Finnegan, Henderson, Farabow, Garrett & Dunner, LLP

(57) ABSTRACT

A gas tank-equipped vehicle equipped with a plurality of gas tanks includes: a vehicle body; a first gas tank disposed with a longitudinal direction thereof along a front-rear direction of the gas tank-equipped vehicle; a second gas tank that is disposed closer to the rear of the gas tank-equipped vehicle than the first gas tank is, and disposed with a longitudinal direction thereof along a left-right direction of the gas tank-equipped vehicle; a first mounting mechanism by which the first gas tank is mounted to the vehicle body; and a plurality of tank bands wound around the second gas tank to mount the second gas tank to the vehicle body.

8 Claims, 14 Drawing Sheets

GAS TANK-EQUIPPED VEHICLE

INCORPORATION BY REFERENCE

The disclosure of Japanese Patent Application No. 2016-029204 filed on Feb. 18, 2016 including the specification, drawings and abstract is incorporated herein by reference in its entirety.

BACKGROUND

1. Technical Field

The present disclosure relates to a gas tank-equipped vehicle, and more particularly to a gas tank-equipped vehicle equipped with a plurality of gas tanks.

2. Description of Related Art

Vehicles such as fuel cell vehicles that are equipped with a plurality of gas tanks for storing a fuel gas such as hydrogen (gas tank-equipped vehicles) are known. Examples of layout of a plurality of gas tanks include one in which a plurality of gas tanks disposed in a T-shape are installed under the floor of an occupant compartment. For example, DE 102009039079 discloses a vehicle equipped with a plurality of gas tanks that are disposed in a T-shape. In DE 102009039079, the gas tanks on the front side of the vehicle (front tanks) are disposed with the longitudinal direction thereof along the vehicle front-rear direction. On the other hand, the gas tank on the rear side of the vehicle (rear tank) is disposed with the longitudinal direction thereof along the vehicle left-right direction.

SUMMARY

If a vehicle collides with an object in front while traveling, the vehicle body may deform significantly. In such an event, it is possible in a vehicle with the gas tanks disposed in a T-shape that the rear tank may be subjected to an impact of the front tank from the front side of the vehicle. In this case, a large impact load may be applied by the front tank to the rear tank due to the small area of contact between the front tank and the rear tank. This may result in damage to the rear tank.

The present disclosure provides a gas tank-equipped vehicle that reduces an impact load applied by the front tank to the rear tank in the event of collision.

According to an aspect of the present disclosure, there is provided a gas tank-equipped vehicle equipped with a plurality of gas tanks, the gas tank-equipped vehicle including: a vehicle body; a first gas tank disposed with a longitudinal direction of the first gas tank along a front-rear direction of the gas tank-equipped vehicle; a second gas tank that is disposed closer to the rear of the gas tank-equipped vehicle than the first gas tank is, and disposed with a longitudinal direction of the second gas tank along a left-right direction of the gas tank-equipped vehicle; a first mounting mechanism by which the first gas tank is mounted to the vehicle body; and a plurality of tank bands wound around the second gas tank to mount the second gas tank to the vehicle body. The tank band includes: a lower band fixed to the vehicle body and supporting the second gas tank from the lower side in a direction of gravity; an upper band covering the second gas tank from the upper side in the direction of gravity; and a coupling part coupling together the lower band and the upper band on the rear side of the gas tank-equipped vehicle and having an expandable and contractable elastic member. The gas tank-equipped vehicle is configured to allow the first gas tank to come in contact with the lower side of the second gas tank when a load from the front side of the gas tank-equipped vehicle is applied to the first gas tank, and is configured such that, when an impact of the first gas tank is applied to the lower side of the second gas tank, the rear side of the upper band in the front-rear direction of the gas tank-equipped vehicle moves upward due to deformation of the elastic member to increase the distance between the upper band and the lower band at the coupling part.

According to the above aspect, the first gas tank comes in contact with the lower side of the second gas tank when a load from the front side is applied to the first gas tank as a result of collision of the gas tank-equipped vehicle. Moreover, when an impact of the first gas tank is applied to the lower side of the second gas tank, the second gas tank can move toward the rear upper side of the vehicle relative to the tank band, i.e., in a direction in which the second gas tank recedes from the first gas tank. Thus, the impact load applied to the second gas tank as a result of collision with the first gas tank can be reduced.

In the above aspect, the first mounting mechanism may be configured such that, when a load larger than a predetermined load is applied from the front side of the gas tank-equipped vehicle to the first gas tank, the rear side of the first gas tank in the front-rear direction of the gas tank-equipped vehicle is released from fixation while the front side of the first gas tank in the front-rear direction of the gas tank-equipped vehicle remains supported.

According to the above aspect, even when the first gas tank is not disposed at a low level, the first gas tank comes in contact with the lower side of the second gas tank when a load from the front side of the vehicle is applied to the first gas tank as a result of collision of the gas tank-equipped vehicle. Thus, it is not necessary to dispose the first gas tank at a low level. Accordingly, the lower surface of the vehicle body can be kept at a low level.

In the above aspect, the rigidity of the upper band may be lower than the rigidity of the lower band.

According to the above aspect, the upper band can deform easily. Thus, the second gas tank can move more easily in a direction in which the second gas tank recedes from the first gas tank.

In the above aspect, the coupling part may be configured such that the lower band and the upper band are released from the coupling of the coupling part when the rear side of the upper band in the front-rear direction of the gas tank-equipped vehicle moves upward beyond a predetermined value.

According to the above aspect, the second gas tank is released from restraint of the tank bands, and thus can move more easily in a direction in which the second gas tank recedes from the first gas tank. Moreover, in a case where a drive unit etc. are disposed on the rear side relative to the second gas tank, an impact load applied by the drive unit to the second gas tank can be reduced. Accordingly, an impact load applied to the second gas tank can be further reduced.

In the above aspect, the gas tank-equipped vehicle may further include a frame that is disposed closer to the rear of the gas tank-equipped vehicle than the second gas tank is. The rear side of the lower band in the front-rear direction of the gas tank-equipped vehicle may project toward the rear side of the gas tank-equipped vehicle, and the gas tank-equipped vehicle may be configured to allow the rear side of lower band in the front-rear direction of the gas tank-equipped vehicle to overlap a part of the front side of the frame in the front-rear direction of the gas tank-equipped vehicle when the vehicle body deforms so as to crush in the front-rear direction of the gas tank-equipped vehicle.

According to the above aspect, even when the second gas tank is released from restraint of the tank bands, the second gas tank is located over the frame or the rear side of the lower band. Thus, the second gas tank is prevented from falling onto a road surface.

In the above aspect, the length of the frame in the left-right direction may be shorter than the length of the second gas tank in the longitudinal direction. The interval between the adjacent tank bands may be shorter than the length of the frame in the left-right direction. A lower surface of the vehicle body may be curved so as to circumvent the first gas tank and the second gas tank.

According to the present disclosure, it is possible to provide a gas tank-equipped vehicle capable of reducing an impact load applied by the front tank to the rear tank in the event of collision.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Embodiment

Figure 1:
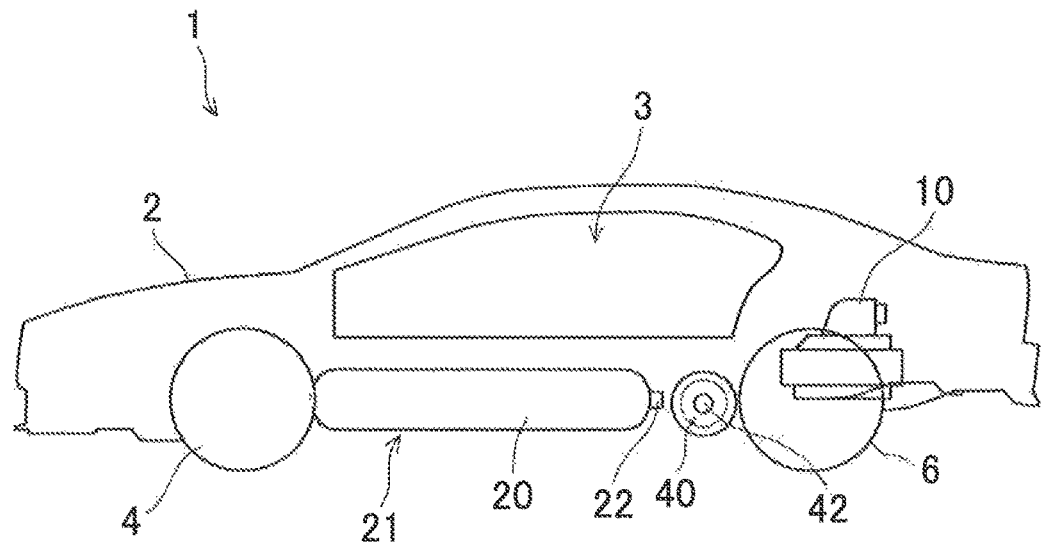
FIG. 1 is a side view showing a gas tank-equipped vehicle according to embodiment.
Figure 2:
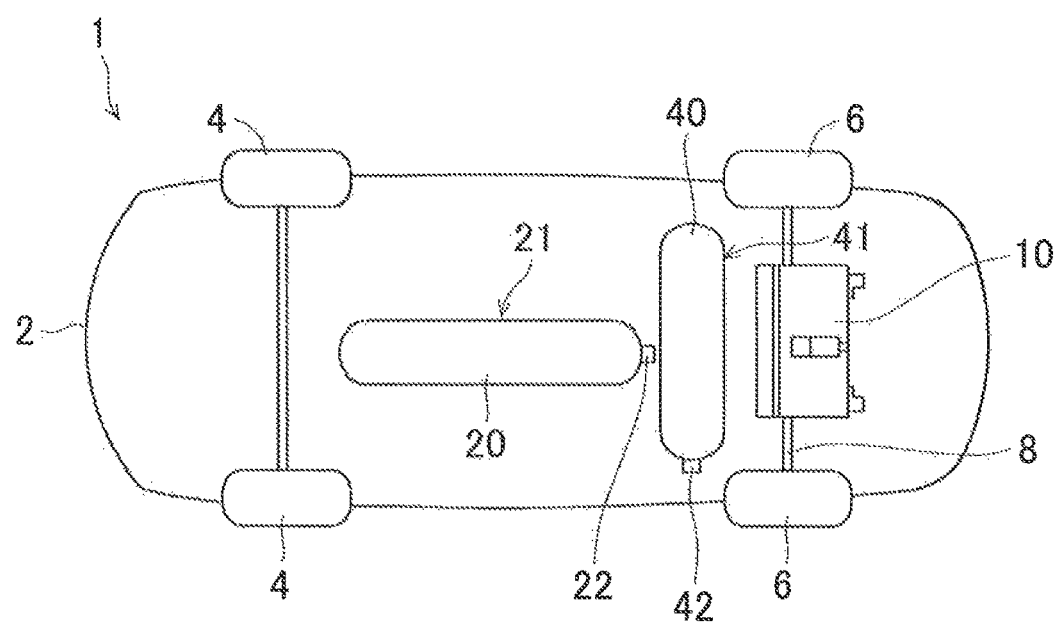
FIG. 2 is a plan view showing the gas tank-equipped vehicle according to the embodiment.
Figure 3:
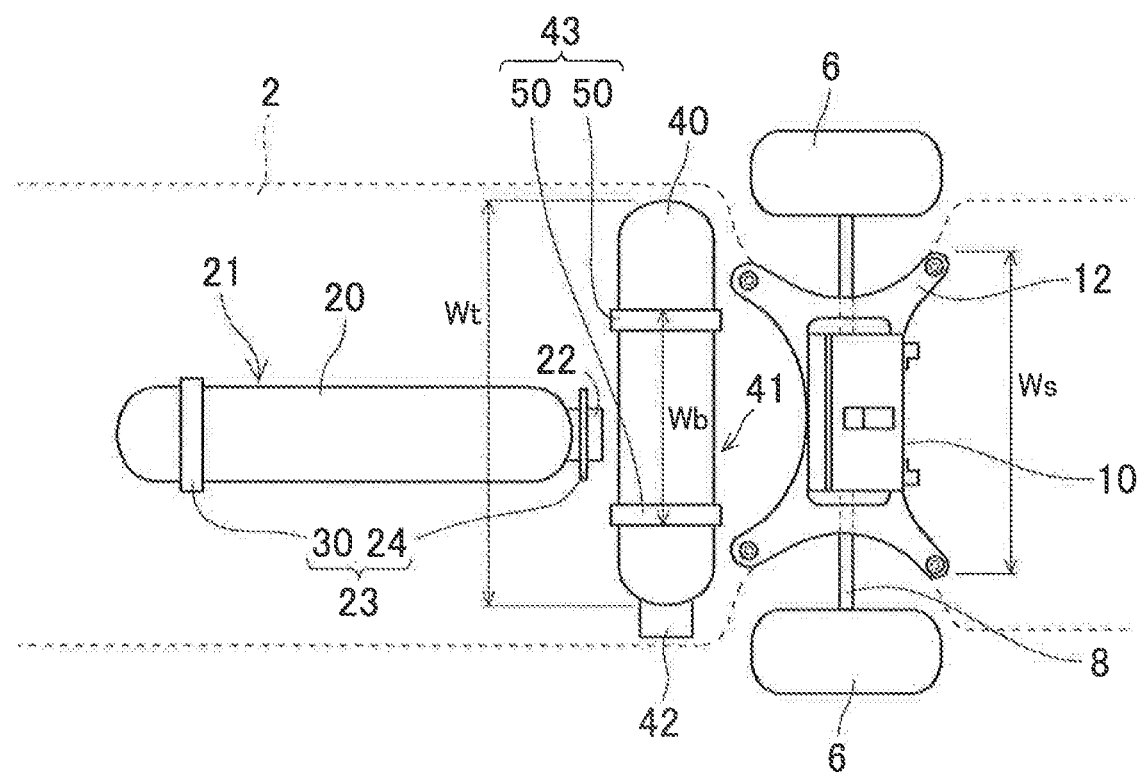
FIG. 3 is a plan view showing the details of the lower side of the gas tank-equipped vehicle according to the embodiment.

An embodiment of the present disclosure will be described below with reference to the drawings. FIG. 1 and FIG. 2 are views showing a gas tank-equipped vehicle 1 according to the embodiment. FIG. 1 is a view of the gas tank-equipped vehicle 1 as seen from the lateral side (left side), and FIG. 2 is a view of the gas tank-equipped vehicle 1 as seen from the lower side. FIG. 3 is a plan view showing the details of the lower side of the gas tank-equipped vehicle 1 according to the embodiment.

The gas tank-equipped vehicle 1 according to the embodiment is a fuel cell vehicle equipped with a plurality of gas tanks. The gas tank-equipped vehicle 1 rotates wheels by driving a motor with electricity generated by a fuel cell. Thus, the gas tank-equipped vehicle 1 can travel. Hereinafter, a "front side" means the front side of the gas tank-equipped vehicle 1. A "rear side" means the rear side of the gas tank-equipped vehicle 1. A "front-rear direction" means the front-rear direction of the gas tank-equipped vehicle 1. A "left-right direction (width direction)" means the left-right direction (width direction) of the gas tank-equipped vehicle 1.

The gas tank-equipped vehicle 1 includes a vehicle body 2, front wheels 4, rear wheels 6, a rear axle 8 connecting the left and right rear wheels 6 to each other, a drive unit 10, a front tank 20 (first gas tank), and a rear tank 40 (second gas tank). The front tank 20 and the rear tank 40 are gas tanks (gas cylinders) for storing a hydrogen gas in a compressed state. The front tank 20 and the rear tank 40 have substantially cylindrical outer shapes.

The front tank 20 has a shell body 21 having a substantially cylindrical shape, and a valve assembly 22 provided at an end of the shell body 21. Similarly, the rear tank 40 has a shell body 41 having a substantially cylindrical shape, and a valve assembly 42 provided at an end of the shell body 41. The valve assembly 22 and the valve assembly 42 are connected to a hydrogen supply pipe (not shown). Hydrogen is supplied to the front tank 20 through the valve assembly 22. Similarly, hydrogen is supplied to the rear tank 40 through the valve assembly 42. The front tank 20 is disposed with the side of the valve assembly 22 facing the rear tank 40. This allows easy connection of the hydrogen supply pipe to the front tank 20.

The front tank 20 and the rear tank 40 are disposed under the vehicle body 2. The front tank 20 is disposed on the side of the front wheels 4, and the rear tank 40 is disposed on the side of the rear wheels 6. Thus, the rear tank 40 is disposed closer to the rear of the gas tank-equipped vehicle 1 than the front tank 20 is. The front tank 20 is disposed with a longitudinal direction thereof along the front-rear direction of the gas tank-equipped vehicle 1. The rear tank 40 is disposed with a longitudinal direction thereof along the left-right direction (width direction) of the gas tank-equipped vehicle 1. Thus, the front tank 20 and the rear tank 40 are disposed substantially in a T-shape. Here, the front tank 20 is disposed at the center of the vehicle under a position between left and right seats provided in an occupant compartment 3.

A lower surface of the vehicle body 2 is curved so as to circumvent the front tank 20 and the rear tank 40. Thus, even when the front tank 20 and the rear tank 40 are disposed under the vehicle body 2, it is possible to secure a clearance from the front tank 20 and the rear tank 40 to a road surface without raising the level of the lower surface of the vehicle body 2. Since the front tank 20 is disposed at the center of the vehicle under the vehicle body 2, the lower surface of the vehicle body 2 bulges toward the occupant compartment 3 so as to circumvent the front tank 20. However, the bulge is located between the left and right seats, and thus does not require the level of the seats to be raised so much. It is therefore possible to secure a large space inside the occupant compartment 3 by disposing the front tank 20 and the rear tank 40 substantially in a T-shape with the longitudinal direction of the front tank 20 along the front-rear direction of the gas tank-equipped vehicle 1. In the case of an FR vehicle, in which the engine is disposed on the front side and the rear wheels are driven, a propeller shaft passes through the center of the vehicle on the lower side, and a tunnel for the propeller shaft to pass through is provided under the lower surface of the vehicle body of the FR vehicle. By contrast, the gas tank-equipped vehicle 1 according to this embodiment does not require a propeller shaft, which offers a possibility of adopting the structure of the vehicle body of an FR vehicle as the structure of the gas tank-equipped vehicle 1 according to this embodiment by disposing the front tank 20 in the tunnel provided in the vehicle body of an FR vehicle. Since a suspension member 12 and a drive shaft (rear axle 8) are installed under the rear side of the vehicle body 2, the rear side of the lower surface of the vehicle body 2 is originally bulged so as to circumvent the suspension member 12 and the drive shaft, whether or not the rear tank 40 is disposed there. Thus, it is possible to dispose the rear tank 40 without involving a major change from a configuration in which the rear tank 40 is not disposed under the lower surface.

The drive unit 10 is a device that drives the rear axle 8. The drive unit 10 has, for example, a transaxle, a motor, etc. The drive unit 10 is disposed closer to the rear of the gas tank-equipped vehicle 1 than the rear tank 40 is.

As shown in FIG. 3, the gas tank-equipped vehicle 1 has the suspension member 12 that is a frame. The suspension member 12 is provided in the vicinity of the rear axle 8. The suspension member 12 is supported on the vehicle body 2 through an elastic member such as a rubber member. The drive unit 10 is supported on the upper side of the suspension member 12.

As shown in FIG. 3, the gas tank-equipped vehicle 1 has a front tank mounting mechanism 23 (first mounting mechanism) and a rear tank mounting mechanism 43 (second mounting mechanism). The front tank 20 is mounted to the vehicle body 2 by the front tank mounting mechanism 23. Similarly, the rear tank 40 is mounted to the vehicle body 2 by the rear tank mounting mechanism 43.

The front tank mounting mechanism 23 has a tank band 30 and a fixing member 24. The tank band 30 has a belt-like shape and is wound around the shell body 21 of the front tank 20. The tank band 30 is fixed to the vehicle body 2. As with tank bands 50 to be described later, the tank band 30 supports the shell body 21 while absorbing changes in shape etc. of the shell body 21 due to the internal pressure thereof. The fixing member 24 is mounted to the valve assembly 22 and fixed to the vehicle body 2. Thus, the front tank mounting mechanism 23 serves to mount the front tank 20 to the vehicle body 2.

The rear tank mounting mechanism 43 has the plurality of tank bands 50. In this embodiment, the rear tank mounting mechanism 43 has two tank bands 50. The tank band 50 has a belt-like shape and is wound around the shell body 41 of the rear tank 40. The tank band 50 is fixed to the vehicle body 2. The tank band 50 supports the shell body 41 while absorbing changes in shape etc. of the shell body 41 due to the internal pressure thereof. Thus, the tank band 50 serves to mount the rear tank 40 to the vehicle body 2. It is preferable that the tank band 30 has substantially the same configuration as the tank band 50.

Since the rear wheels 6 are present on the left and right sides of the suspension member 12, a length Ws of the suspension member 12 in the left-right direction is shorter than a length Wt of the rear tank 40 in the longitudinal direction. An interval Wb between the adjacent tank bands 50 is preferably shorter than the length Ws of the suspension member 12 in the left-right direction.

Figure 4:
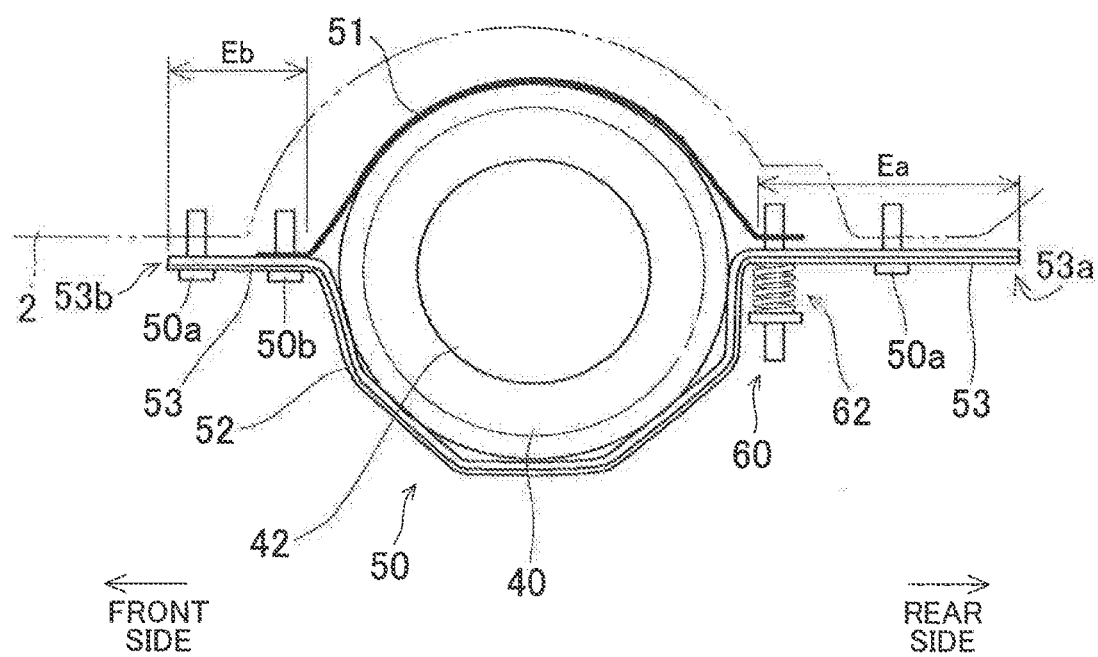
FIG. 4 is a view showing a state in which a rear tank according to the embodiment is mounted to a vehicle body.

FIG. 4 is a view showing a state in which the rear tank 40 according to the embodiment is mounted to the vehicle body 2. FIG. 4 is a view of the rear tank 40 as seen from the side of the valve assembly 42. Accordingly, the left side and the right side of FIG. 4 correspond respectively to the front side of the gas tank-equipped vehicle 1 and the rear side of the gas tank-equipped vehicle 1. As described above, the lower surface of the vehicle body 2 is curved so as to circumvent the rear tank 40.

As shown in FIG. 4, the tank band 50 includes an upper band 51, a lower band 52, and a coupling part 60. The upper band 51 and the lower band 52 are each formed of a metal sheet in a substantially semicircular shape. The tank band 50 serves to mount the rear tank 40 to the vehicle body 2 by holding the rear tank 40 between the upper band 51 and the lower band 52.

The lower band 52 has fixing plates 53 that project in a direction substantially perpendicular to the longitudinal direction of the rear tank 40, i.e., in the front-rear direction of the gas tank-equipped vehicle 1. In other words, a rear-side end 53a of the lower band 52 projects toward the rear side of the gas tank-equipped vehicle 1. Similarly, a front-side end 53b of the lower band 52 projects toward the front side of the gas tank-equipped vehicle 1. The lower band 52 is fixed to the vehicle body 2 as the fixing plates 53 and the vehicle body 2 are fastened together with bolts 50a. The lower band 52 has high rigidity and supports the rear tank 40 from the lower side in a direction of gravity. A projection length Ea of the rear-side end 53a of the lower band 52 projecting toward the rear side may preferably be longer than a projection length Eb of the front-side end 53b of the lower band 52 projecting toward the front side. The distance between the position of the bolt 50a and the end 53a in the rear-side fixing plate 53 may be longer than the distance between the position of the bolt 50a and the end 53b in the front-side fixing plate 53.

The upper band 51 covers the rear tank 40 from the upper side in the direction of gravity. The upper band 51 is firmly fixed at the front side to the fixing plate 53 with a fixing member 50b such as a bolt. Alternatively, the fixing member 50b may be realized by welding of the upper band 51 and the fixing plate 53. On the other hand, the upper band 51 is coupled at the rear side to the fixing plate 53 by the coupling part 60. In other words, the coupling part 60 couples together the upper band 51 and the lower band 52 on the rear side. The coupling part 60 has a spring 62 that is an expandable and contractable elastic member. The details of the coupling part 60 will be described later.

It is preferable that the rigidity of the lower band 52 is higher than the rigidity of the upper band 51. To put it the other way around, the rigidity of the upper band 51 may be lower than the rigidity of the lower band 52. Specifically, the upper band 51 may be formed of one metal sheet, while the lower band 52 may be formed of a stack of a plurality of metal sheets. Alternatively, the lower band 52 may be formed of a metal sheet having a larger thickness than the upper band 51. The lower band 52 may have a reinforcing member, such as a rib, to enhance the rigidity.

Since the lower band 52 has high rigidity, the lower band 52 does not deform easily under an external force. Thus, the lower band 52 can support the rear tank 40 more reliably. By contrast, since the upper band 51 has low rigidity, the upper band 51 deforms easily under an external force. Thus, as will be described later, the upper band 51 deforms easily upward when a load is applied thereto by the rear tank 40 from the lower side toward the upper side.

Figure 5:
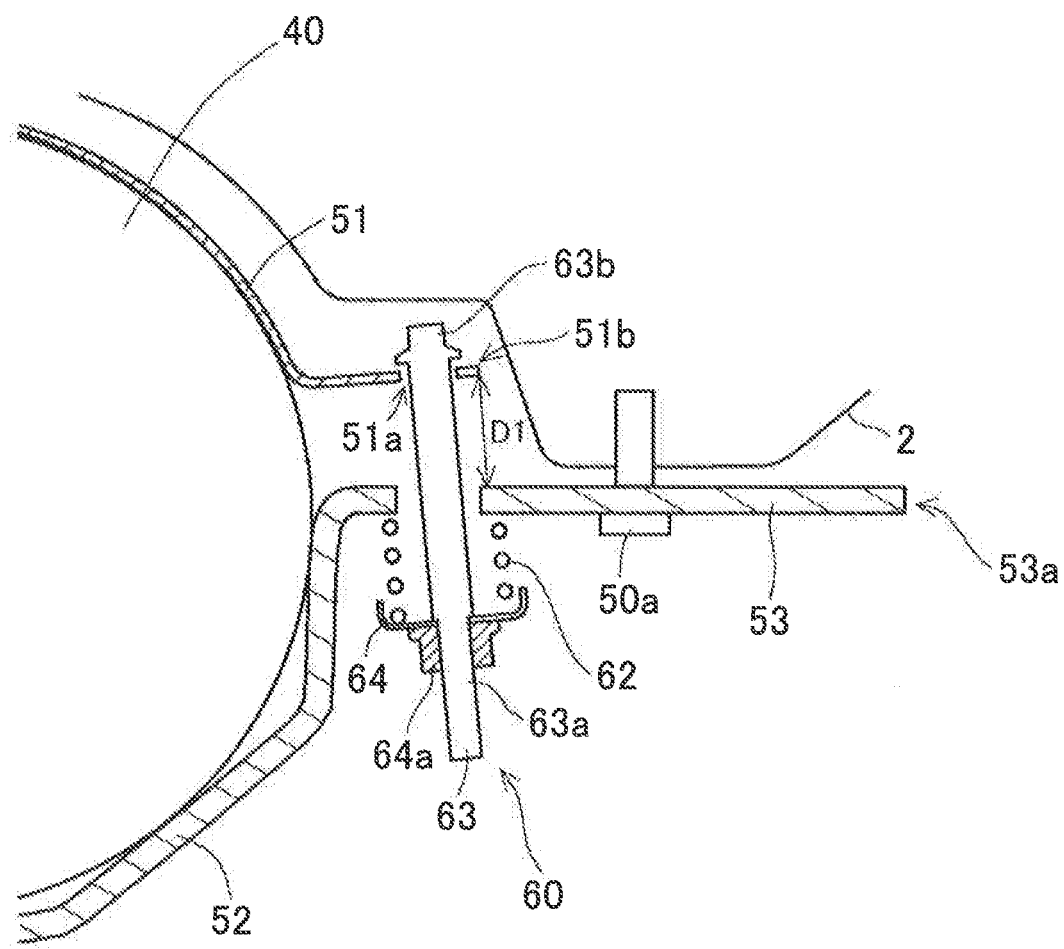
FIG. 5 is a view showing the details of a coupling part according to the embodiment.

FIG. 5 is a view showing the details of the coupling part 60 according to the embodiment. The coupling part 60 has the spring 62 that is an elastic member, a bolt 63, and a spring seat 64. The spring 62 is provided between the fixing plate 53 and the spring seat 64. The bolt 63 penetrates a mounting hole 51a formed on the rear side of the upper band 51, the fixing plate 53 (lower band 52), and the spring 62.

A head 63b having a diameter larger than the diameter of the mounting hole 51a is formed at the upper end of the bolt 63. Thus, the head 63b is retained around the mounting hole 51a of the upper band 51. A thread 63a is formed at the lower end of the bolt 63. As the thread 63a is screwed into a nut 64a of the spring seat 64, the distance between the head 63b (upper band 51) and the spring seat 64 decreases. As a result, the spring 62 is compressed by the spring seat 64. In this way, the upper band 51 is coupled to the lower band 52 through the spring 62 and the spring seat 64. That is, as the spring 62 is compressed and the spring seat 64 is urged downward, the upper band 51 is coupled to the lower band 52 through the coupling part 60.

It is not necessary for the coupling part 60 to bring the upper band 51 in contact with the lower band 52 (fixing plate 53). A small space may be left between the upper band 51 and the lower band 52 as long as the rear tank 40 does not rattle between the upper band 51 and the lower band 52 at normal times (other times than upon collision). When the internal pressure of the rear tank 40 rises, the diameter of the rear tank 40 increases, so that a distance D1 between the upper band 51 and the lower band 52 at the coupling part 60 increases and the spring 62 is further compressed. Conversely, when the internal pressure of the rear tank 40 decreases, the diameter of the rear tank 40 decreases, so that the distance D1 between the upper band 51 and the lower band 52 at the coupling part 60 decreases and the compression of the spring 62 is reduced. In this way, the tank band 50 supports the rear tank 40 while absorbing changes in shape etc. of the rear tank 40 due to the internal pressure thereof.

On the other hand, when the upper band 51 deforms upward due to an upward motion of the rear tank 40 etc., the bolt 63 and the spring seat 64 also move upward, since the head 63b of the bolt 63 is in contact with the periphery of the mounting hole 51a. As a result, the spring 62 is further compressed. Moreover, the distance D1 between the upper band 51 and the lower band 52 increases. In other words, the rear-side end (rear end 51b) of the upper band 51 moves upward due to deformation of the spring 62. Then, when the upper band 51 still deforms upward after the spring 62 has been completely compressed, and a distance between the upper band 51 and the lower band 52 reaches a distance D1max, the upper band 51 breaks at the position of the mounting hole 51a etc. due to the low rigidity of the upper band 51. Thus, the tank band 50 is configured so that, when the tank band 50 opens beyond the distance D1max, the upper band 51 and the lower band 52 are released from the coupling part 60. In other words, the tank band 50 is configured so that, when the upper band 51 moves upward beyond the distance D1max, the upper band 51 and the lower band 52 are released from the coupling part 60. In this case, the upper band 51 opens wide from the lower band 52. The distance D1max that is a threshold above which the upper band 51 and the lower band 52 are released from the coupling part 60 can be determined according to the strength of the upper band 51 etc. Since the lower band 52 has high rigidity, the lower band 52 hardly deforms in the meantime.

Figure 6:
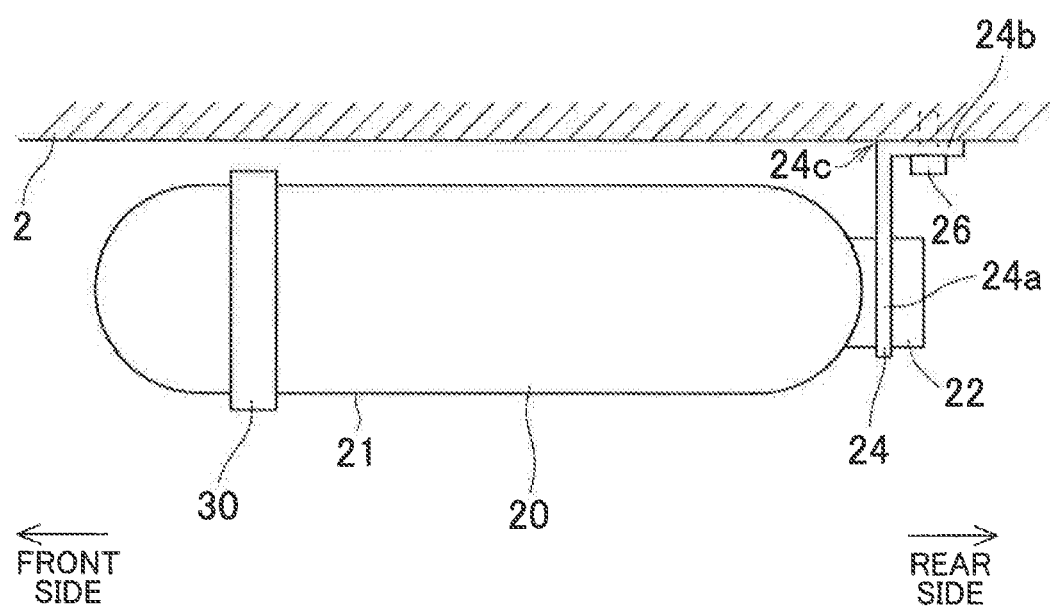
FIG. 6 is a view showing a state in which a front tank according to the embodiment is mounted to the vehicle body.

FIG. 6 is a view showing a state in which the front tank 20 according to the embodiment is mounted to the vehicle body 2. The left side and the right side of FIG. 6 correspond respectively to the front side and the rear side of the gas tank-equipped vehicle 1. As mentioned above, the tank band 30 has the same configuration as the tank band 50. The detailed description thereof will be therefore omitted. In the same manner as shown in FIG. 4 and FIG. 5, the tank band 30 serves to support the shell body 21 of the front tank 20 and mount the front tank 20 to the vehicle body 2.

As described above, the fixing member 24 is mounted to the valve assembly 22 and thus supports the rear side of the front tank 20. On the other hand, the tank band 30 supports the front side of the front tank 20. In the embodiment, the fixing member 24 is formed of a substantially L-shaped metal sheet having a vertical part 24a and a horizontal part 24b. The vertical part 24a is fixed to the valve assembly 22. On the other hand, the horizontal part 24b is fixed with a bolt 26 to the vehicle body 2. Thus, the fixing member 24 serves to support the valve assembly 22 and mount the front tank 20 to the vehicle body 2.

Here, the fixing member 24 is configured to release the front tank 20 when a large load is applied from the front side to the front tank 20. Specifically, when a large load Fc is applied from the front side to the front tank 20, the front tank 20 moves relative to the fixing member 24, so that a load according to the load of the front tank 20 is applied to the fixing member 24. As a result, the fixing member 24 bends, and breaks, for example, in the vicinity of a corner 24c between the vertical part 24a and the horizontal part 24b. For example, the thickness in the vicinity of the corner 24c may be reduced so that the fixing member 24 breaks at that portion with the reduced thickness. Thus, the fixing member 24 is configured to release the rear side of the front tank 20 when a load larger than a predetermined load (Fc) is applied from the front side to the front tank 20.

Here, the large load Fc applied to the front tank 20 corresponds to a load applied to the gas tank-equipped vehicle 1 upon frontal collision with an object. This means that the load Fc is larger than a maximum load estimated to be applied to the gas tank-equipped vehicle 1 when the gas tank-equipped vehicle 1 is moving without collision. For example, the load Fc is larger than an inertial force applied to the front tank 20 in the event of sudden braking while the gas tank-equipped vehicle 1 is traveling at the maximum speed. Therefore, the fixing member 24 is formed so as not to break when such a maximum load without collision is applied to the front tank 20, but to break when a load larger than the load Fc is applied to the front tank 20. The load Fc can be determined according to an impact load estimated to result from collision of the gas tank-equipped vehicle 1 and to the strength of the fixing member 24. The tank band 30 restrains the front tank 20 in the front-rear direction by the frictional force derived from fastening of the tank band 30 by a coupling part. Here, this frictional force is smaller than the load Fc. Accordingly, when a load larger than the load Fc is applied from the front side to the front tank 20 and the fixing member 24 releases the front tank 20, the shell body 21 of the front tank 20 slides on the inner side of the tank band 30 and moves toward the rear side relative to the tank band 30.

Here, the actual behaviors of the gas tanks upon collision of the gas tank-equipped vehicle 1 will be described. The gas tank-equipped vehicle 1 traveling forward is subjected to an impact from the front side by colliding with an object in front. At that moment, the front-side part of the gas tank-equipped vehicle 1 stops moving forward as a result of collision. Meanwhile, since the vehicle body 2 breaks and crushes toward the front side, the front tank 20 keeps moving forward without stopping as the front-side part of the gas tank-equipped vehicle 1 stops moving. As a result, the front tank 20 comes in contact (collides) with the front-side part of the gas tank-equipped vehicle 1 that has stopped, and is subjected to an impact load (collision load) from the front side. In this case, the rear tank 40 keeps moving forward even after the front tank 20 stops moving forward. As a result, the rear tank 40 comes in contact (collides) with the front tank 20 and is subjected to an impact load (collision load) from the front tank 20. In this embodiment, relative movements as seen from the tank band 50 are described to clarify the description.

Figure 7:
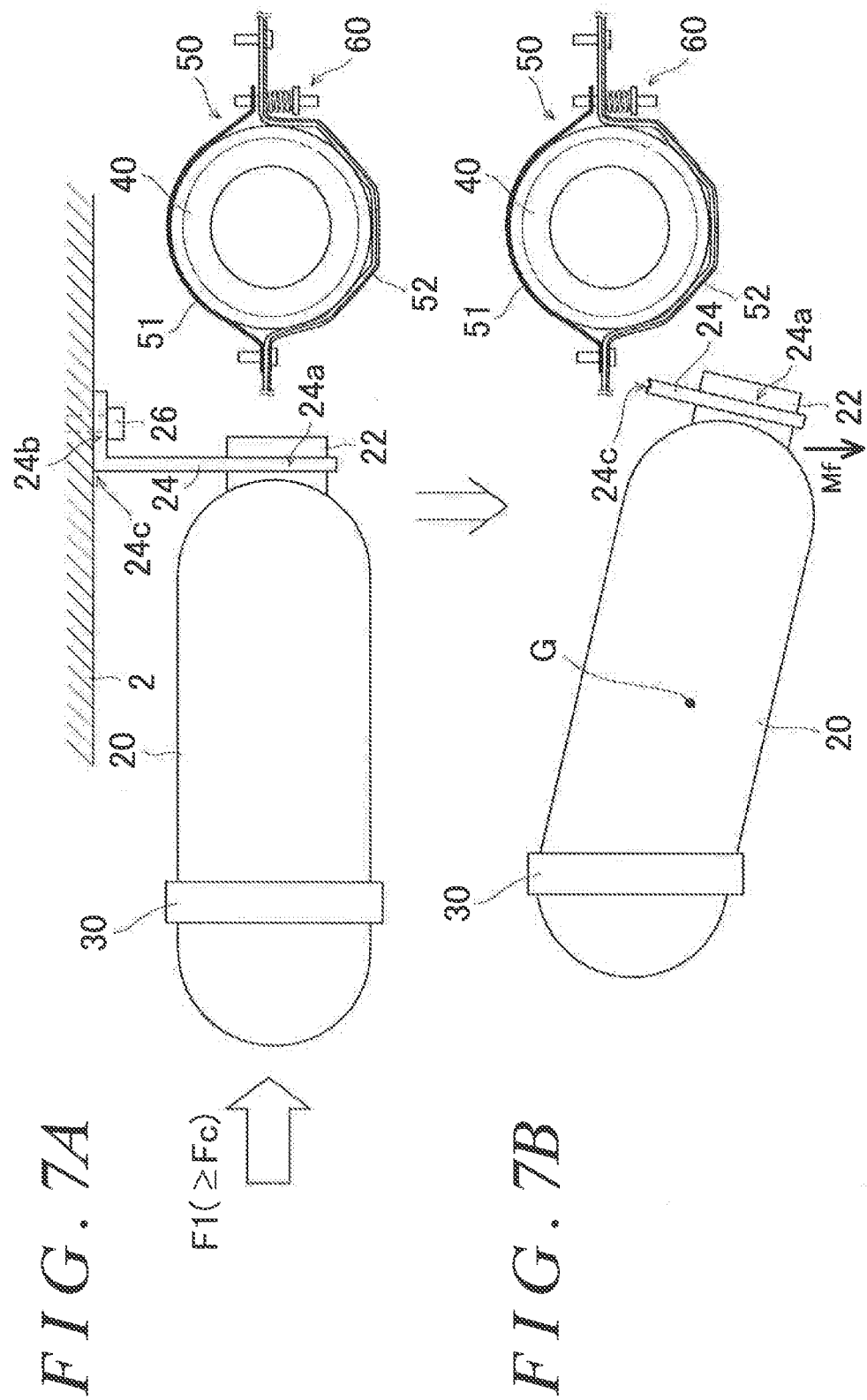
FIG. 7A is a view showing behaviors of the front tank and the rear tank upon collision of the gas tank-equipped vehicle according to the embodiment.
FIG. 7B is a view showing behaviors of the front tank and the rear tank upon collision of the gas tank-equipped vehicle according to the embodiment.

FIGS. 7A and 7B to FIGS. 11A and 11B are views showing behaviors of the front tank 20 and the rear tank 40 upon collision of the gas tank-equipped vehicle 1 according to the embodiment. As shown in FIG. 7A, when a load F1 (≥Fc) is applied from the front side to the front tank 20 as a result of collision, the fixing member 24 releases the rear side of the front tank 20 by breaking in the vicinity of the corner 24c etc. as described above. Thus, as indicated by the arrow Mf in FIG. 7B, the rear side of the front tank 20, i.e., the side of the valve assembly 22 drops.

When the load F1 is applied from the front side to the front tank 20, the shell body 21 of the front tank 20 slides on the inner side of the tank band 30. Accordingly, the tank band 30 is not subjected to a load equivalent to the load F1 but only to a load comparable to the frictional force caused by sliding of the front tank 20. Thus, the tank band 30 can remain supported on the vehicle body 2. Even if the fixing member 24 releases the rear side of the front tank 20 and the side of the valve assembly 22 of the front tank 20 drops, the tank band 30 can support the front side of the shell body 21, i.e., the front tank 20. In other words, the front tank mounting mechanism 23 is configured so that, when a load larger than the load Fc is applied from the front side to the front tank 20, the rear side of the front tank 20 can be released while the front side of the front tank 20 remains supported. When released from the fixing member 24, the rear side of the front tank 20 drops easily, since the valve assembly 22 that is a heavy object is located on the rear side and a position of the center of gravity G is located closer to the rear than the position at which the tank band is fixed.

Figure 8:
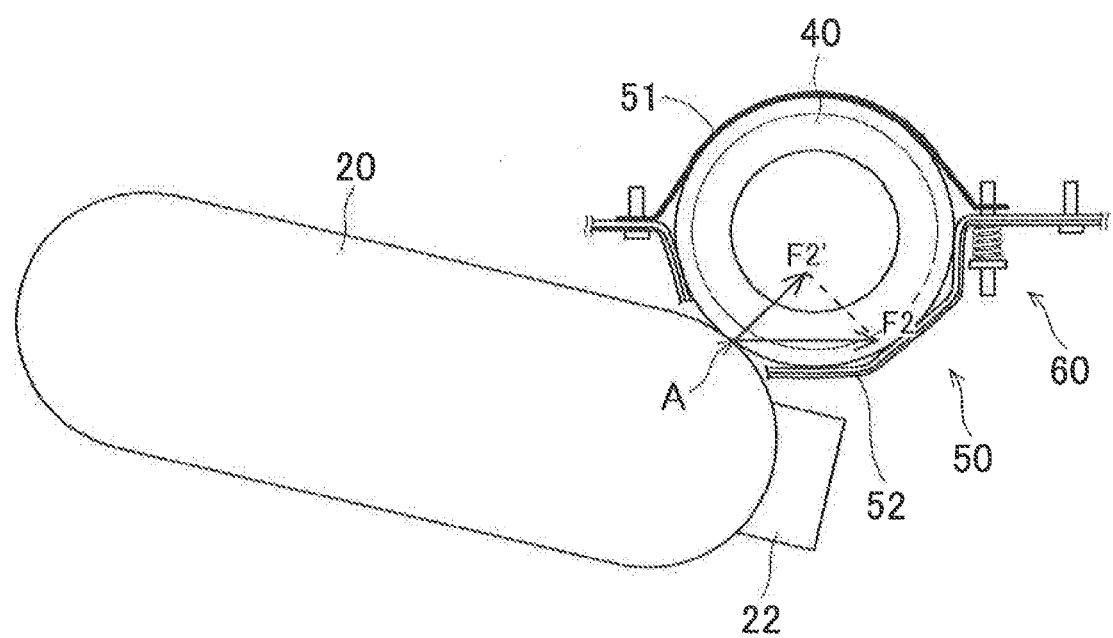
FIG. 8 is a view showing behaviors of the front tank and the rear tank upon collision of the gas tank-equipped vehicle according to the embodiment.

As shown in FIG. 8, the front tank 20 can come in contact (collide) with the shell body 41 of the rear tank 40 at the position indicated by the arrow A (position A). The front tank mounting mechanism 23 is not shown in FIG. 8. Here, the position A is located closer to the lower side than the center of gravity of the rear tank 40 is. Thus, as shown in FIG. 7B, the side of the valve assembly 22 of the front tank 20 drops by being released from the fixing member 24, so that the front tank 20 comes in contact with the lower side of the rear tank 40 when coming in contact with the rear tank 40. In other words, the gas tank-equipped vehicle 1 according to the embodiment is configured to allow the front tank 20 to come in contact with the lower side of the rear tank 40 when a load from the front side is applied to the front tank 20. However, the front tank 20 does not always come in contact with the rear tank 40 when the gas tank-equipped vehicle 1 collides with an object in front. As the side of the valve assembly 22 of the front tank 20 drops by being released from the fixing member 24, contact of the front tank 20 with the rear tank 40 is more likely to be avoided than when the side of the valve assembly 22 does not drop.

Suppose that the front tank 20 comes in contact (collides) with the rear tank 40 and a load F2 is applied by the front tank 20 to the rear tank 40 in the horizontal direction (front-rear direction). In this case, a load F2' applied to the rear tank 40 in a direction toward the center of gravity thereof, i.e., toward the rear upper side, at the position A is smaller than the load F2. The load F2' is smaller as the position A is lower. Thus, compared with when the side of the valve assembly 22 of the front tank 20 does not drop, letting the side of the valve assembly 22 drop can reduce the load applied to the rear tank 40 when the front tank 20 comes in contact with the rear tank 40.

Figure 9:
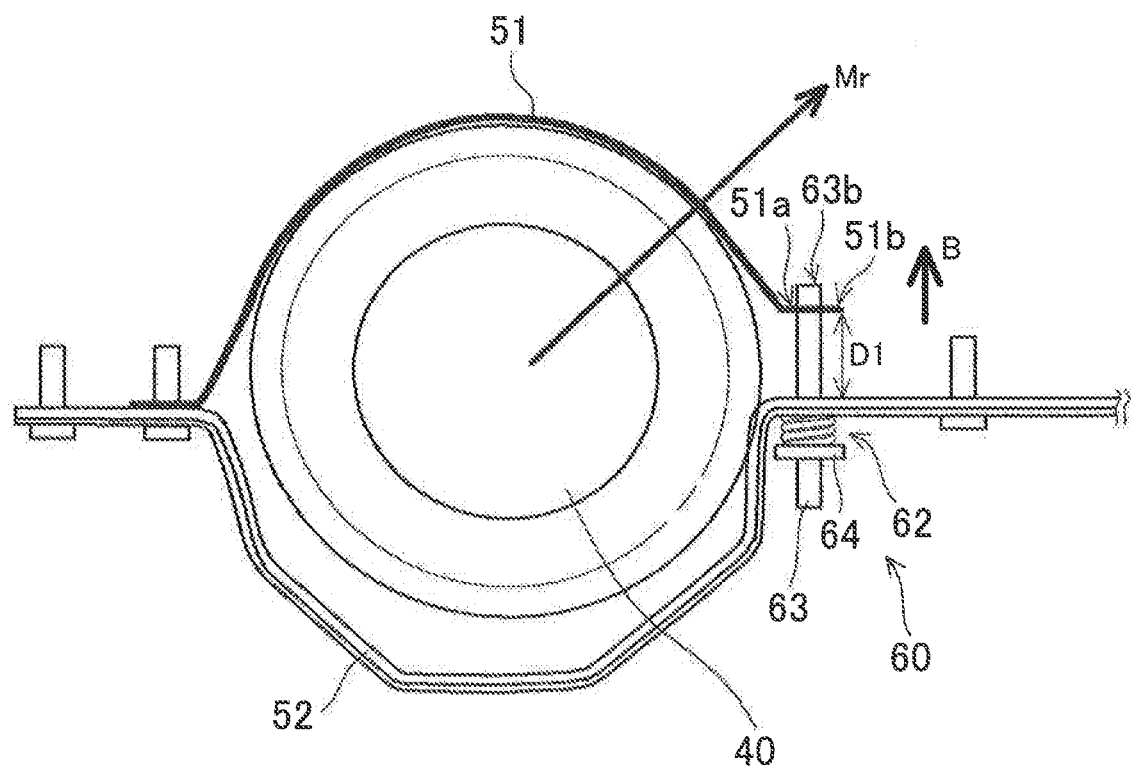
FIG. 9 is a view showing behaviors of the rear tank upon collision of the gas tank-equipped vehicle according to the embodiment.

In this case, as indicated by the arrow Mr in FIG. 9, the rear tank 40 presses the upper band 51 in the direction indicated by the arrow Mr toward the rear upper side as seen from the tank band 50, by the load F2' that is applied toward the rear upper side. As a result, the upper band 51 deforms so as to spread toward the rear upper side as indicated by the arrow Mr in FIG. 9. Meanwhile, the periphery of the mounting hole 51a of the upper band 51 moves upward as indicated by the arrow B. Accordingly, the bolt 63 also moves upward as indicated by the arrow B. At the same time, the spring 62 deforms so as to be further compressed as the spring seat 64 moves upward.

The coupling part 60 is thus configured to open due to deformation of the spring 62 when an impact of the front tank 20 is applied to the lower side of the rear tank 40. In other words, the tank band 50 is configured to open due to deformation of the spring 62 in such a case. In yet other words, in such a case, the distance D1 between the upper band 51 and the lower band 52 at the coupling part 60 increases as the rear end 51b of the upper band 51 moves upward. Moreover, the tank band 50 deforms (the rear end 51b of the upper band 51 moves upward) as described above. Thus, the rear tank 40 can move toward the rear upper side relative to the tank band 50, as indicated by the arrow Mr, when an impact of the front tank 20 is applied to the lower side of the rear tank 40. In this case, being formed so as to have low rigidity, the upper band 51 can deform easily under the pressing of the rear tank 40.

Thus, in the embodiment, the rear tank 40 can move toward the rear upper side relative to the tank band 50 when an impact of the front tank 20 is applied to the lower side of the rear tank 40. In other words, the rear tank 40 can move in a direction in which the rear tank 40 recedes from the front tank 20. Thus, compared with when the rear tank 40 is fixed by the tank band 50 so as not to be movable toward the rear upper side, the impact load applied to the rear tank 40 as a result of contact (collision) with the front tank 20 can be reduced. Accordingly, damage to the rear tank 40 can be prevented.

When the rear tank 40 further presses the upper band 51 toward the rear upper side as seen from the tank band 50 (in the direction indicated by the arrow Mr), the upper band 51 deforms further upward. When the spring 62 is completely compressed and the tank band 50 opens so that the distance between the upper band 51 and the lower band 52 exceeds the distance D1max, the upper band 51 breaks at the position of the mounting hole 51a etc. As a result, the coupling part 60 releases the upper band 51 and the lower band 52.

Figure 10:
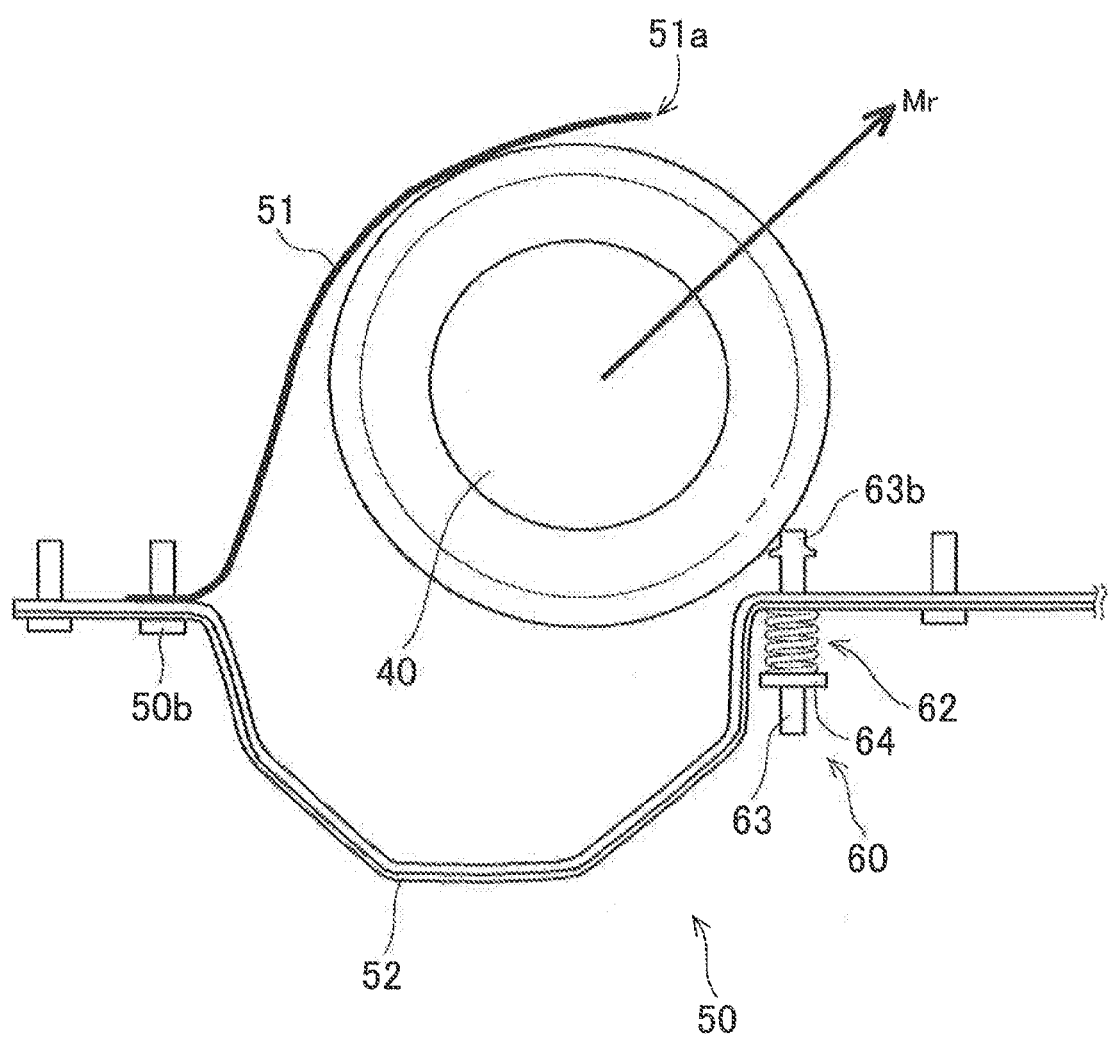
FIG. 10 is a view showing behaviors of the rear tank upon collision of the gas tank-equipped vehicle according to the embodiment.

Now that the upper band 51 is released from the coupling part 60, there is no restriction on the rear side of the upper band 51. Therefore, when the rear tank 40 further presses the upper band 51 in the direction indicated by the arrow Mr, the upper band 51 accordingly opens the tank band 50 wide on the rear upper side as shown in FIG. 10. In other words, the rear tank 40 can push open the upper band 51. As a result, the rear tank 40 can slip out of the lower band 52 toward the rear upper side. Then, the rear tank 40 can recede further away from the front tank 20. Thus, compared with when the coupling part 60 keeps coupling together the upper band 51 and the lower band 52, the impact load applied to the rear tank 40 as a result of contact (collision) with the front tank 20 can be reduced. Accordingly, damage to the rear tank 40 can be further prevented.

Figure 11B:
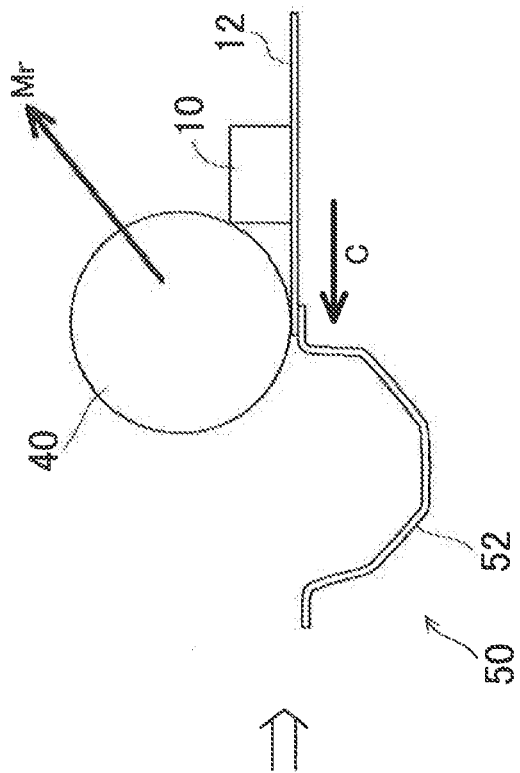
FIG. 11B is a view showing behaviors of the rear tank upon collision of the gas tank-equipped vehicle according to the embodiment.
Figure 11A:
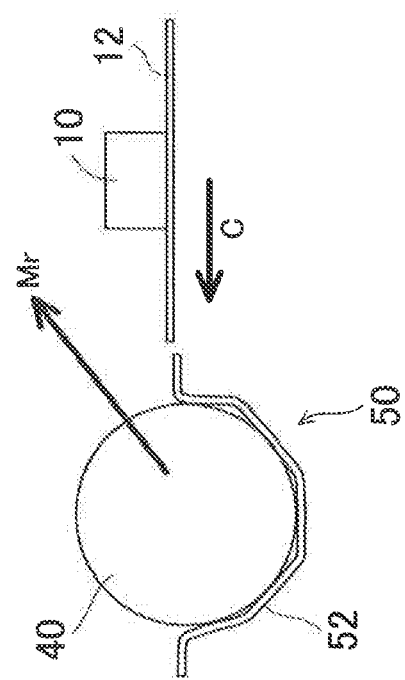
FIG. 11A is a view showing behaviors of the rear tank upon collision of the gas tank-equipped vehicle according to the embodiment.

FIGS. 11A and 11B are views showing behaviors of the rear tank 40 and the drive unit 10 upon collision of the gas tank-equipped vehicle 1 according to the embodiment. The upper band 51 is not shown in FIGS. 11A and 11B. As described with FIG. 9 and FIG. 10, when an impact is applied from the front tank 20 to the lower side of the rear tank 40, the rear tank 40 can recede from the front tank 20 by moving toward the rear upper side relative to the tank band 50 (lower band 52) as indicated by the arrow Mr in FIG. 11A. On the other hand, if the vehicle body 2 deforms so as to crush in the front-rear direction as a result of collision, the drive unit 10 supported on the suspension member 12 may come closer to the rear tank 40 as indicated by the arrow C in FIG. 11A.

In such a case, as the rear tank 40 has been released from restraint of the tank band 50, the rear tank 40 slips out of the lower band 52 toward the rear upper side as indicated by the arrow Mr in FIG. 11B. Here, the rear tank 40 having slipped out of the lower band 52 may come in contact (collide) with the drive unit 10 disposed on the rear side. However, the rear tank 40 has moved obliquely upward relative to the drive unit 10. Therefore, even if the rear tank 40 comes in contact with the drive unit 10, the impact load applied by the drive unit 10 to the rear tank 40 is small compared with when the rear tank 40 comes in contact with the drive unit 10 without moving obliquely upward relative to the drive unit 10. Thus, in this embodiment, the impact load applied to the rear tank 40 as a result of contact (collision) with the drive unit 10 can be reduced. Accordingly, damage to the rear tank 40 can be further prevented.

Suppose that, upon collision of the gas tank-equipped vehicle 1, the front tank 20 comes in contact (collides) with the rear tank 40 in the vicinity of the center thereof and the rear tank 40 remains restrained by the tank bands 50. In this case, the rear tank 40 may be squeezed between the front tank 20 and the drive unit 10. Then, the rear tank 40 may be subjected to an impact load of the front tank 20 from the front side as well as to the impact load of the drive unit 10 from the rear side. Thus, the rear tank 40 may be subjected to an excessively large impact load. In this embodiment, by contrast, upon collision of the gas tank-equipped vehicle 1, the front tank 20 can come in contact with the lower side of the rear tank 40, and then the rear tank 40 can move toward the rear upper side relative to the tank band 50. Thus, the rear tank 40 is prevented from being squeezed between the front tank 20 and the drive unit 10. Accordingly, the rear tank 40 can be prevented from being subjected to an excessively large impact load of the front tank 20 and the drive unit 10. These effects can be achieved more efficiently if the shell body 41 of the rear tank 40 has a substantially cylindrical shape. In addition, these effects can be achieved more efficiently if a motor of the drive unit 10 has also a substantially cylindrical shape.

Figure 12:
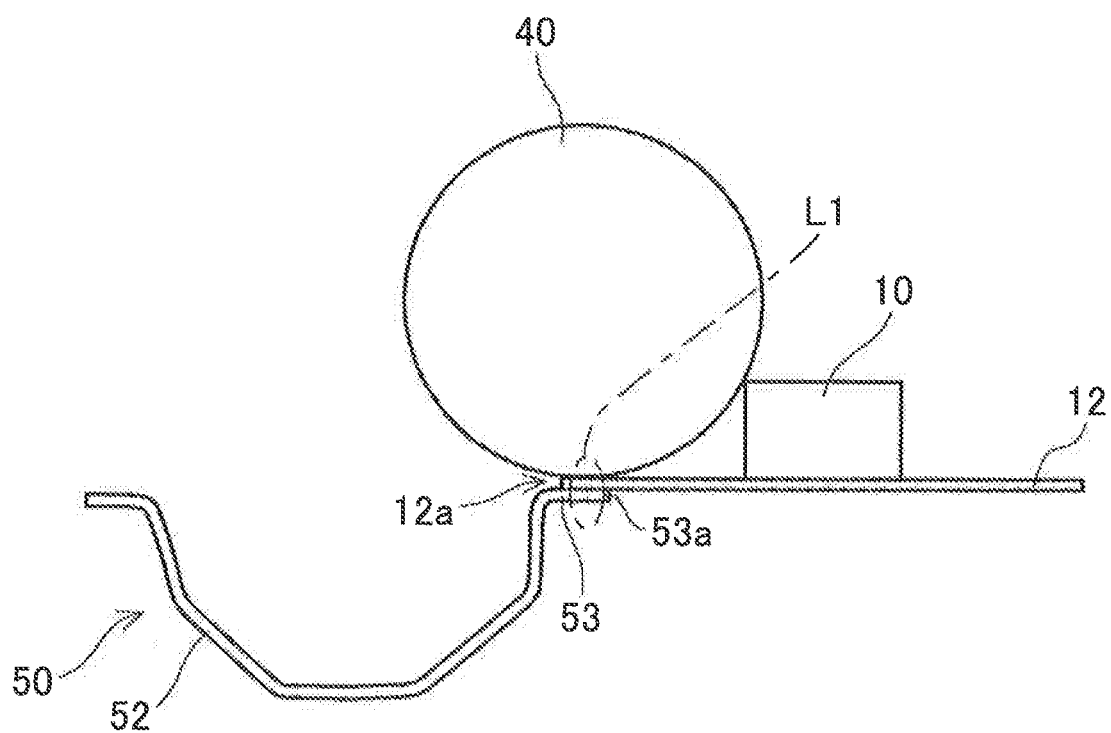
FIG. 12 is a view showing a state in which changes around the rear tank have settled after collision of the gas tank-equipped vehicle according to the embodiment.
Figure 13:
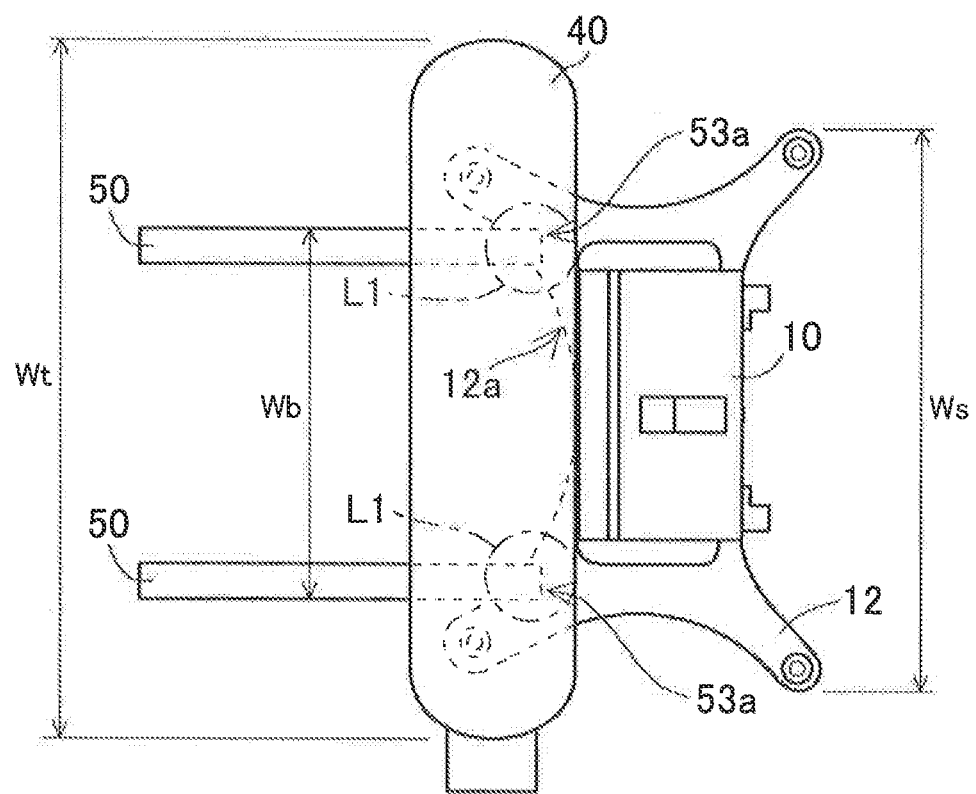
FIG. 13 is a view showing a state in which changes around the rear tank have settled after collision of the gas tank-equipped vehicle according to the embodiment.

FIG. 12 and FIG. 13 are views showing a state in which changes around the rear tank 40 have settled after collision of the gas tank-equipped vehicle 1 according to the embodiment. FIG. 12 is a view around the rear tank 40 as seen from the lateral side (left side), and FIG. 13 is a plan view around the rear tank 40 as seen from above. The upper band 51 is not shown in FIG. 12 and FIG. 13.

When the vehicle body 2 deforms so as to crush in the front-rear direction as a result of collision, the suspension member 12 comes closer to the lower band 52 as shown in FIGS. 11A and 11B. Here, the suspension member 12 is disposed so that the position thereof in the upper-lower direction is shifted slightly upward from the position of the rear-side fixing plate 53 of the lower band 52 in the upper-lower direction. Therefore, even if the suspension member 12 moves toward the lower band 52, the suspension member 12 does not collide with the fixing plate 53 of the lower band 52. Alternatively, the position of the suspension member 12 in the upper-lower direction may be shifted slightly downward from the position of the rear-side fixing plate 53 of the lower band 52 in the upper-lower direction. Since the fixing plate 53 is shifted in the left-right direction from support parts of the suspension member 12, the fixing plate 53 does not collide with the support parts of the suspension member 12.

When the vehicle body 2 deforms so as to crush in the front-rear direction as a result of collision, the suspension member 12 stands still at such a position that a part of a front edge 12a of the suspension member 12 overlaps the rear-side fixing plate 53 of the lower band 52 as indicated by the dashed lines L1 in FIG. 12 and FIG. 13. In other words, when the vehicle body 2 deforms so as to crush in the front-rear direction, the rear-side fixing plate 53 of the lower band 52 overlaps a part of the front edge 12a of the suspension member 12. As described above, the interval Wb between the adjacent tank bands 50 is shorter than the length Ws of the suspension member 12 in the left-right direction. Accordingly, the rear-side fixing plate 53 of the lower band 52 can more reliably overlap a part of the front edge 12a of the suspension member 12.

Thus, even if the rear tank 40 slips out of the lower band 52 as described above, the rear tank 40 is located over the suspension member (or the rear-side fixing plate 53) when the rear tank 40 stands still. Therefore, even if the rear tank 40 is separated from the tank band 50, the rear tank 40 can be prevented from falling onto a road surface. By appropriately adjusting the distance between the suspension member 12 and the lower band 52 (tank band 50) during manufacturing of the gas tank-equipped vehicle 1, it is possible to cause the suspension member 12 to stand still at such a position that, in the event of collision, a part of the front edge 12a of the suspension member 12 overlaps the rear-side fixing plate 53 of the lower band 52. Alternatively, some restraining member (stopper) may be provided to prevent the suspension member 12 from moving too far forward and passing by the lower band 52.

Modified Examples

The present disclosure is not limited to the above embodiment, but can be appropriately modified within the scope of the disclosure. For example, in the embodiment, the fixing member 24 is configured to release the front tank 20 when a large load is applied from the front side to the front tank 20 as a result of collision. Thus, the rear side of the front tank 20 can drop. However, it is not absolutely necessary that the rear side of the front tank 20 drops in the event of collision.

Figure 14:
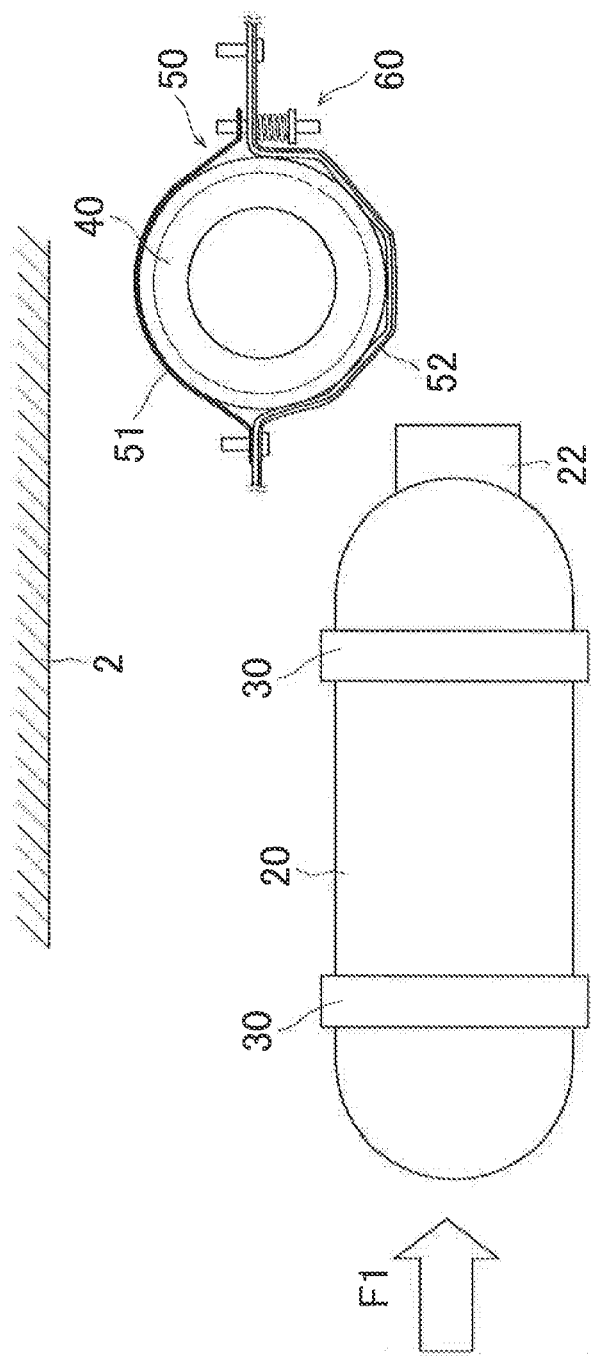
FIG. 14 is a view showing a layout of the front tank and the rear tank according to a first modified example.

FIG. 14 is a view showing a layout of the front tank 20 and the rear tank 40 according to a first modified example. In the example shown in FIG. 14, the front tank 20 is disposed at a lower position than the rear tank 40. The rear side of the front tank 20 is supported by the tank band 30 as with the front side thereof. This layout allows the front tank 20 to come in contact with the lower side of the rear tank 40, without letting the rear side of the front tank 20 drop, when the load F1 is applied from the front side to the front tank 20. In this layout, however, due to the long distance from the lower surface of the vehicle body 2 to the front tank 20, it is necessary to place the lower surface of the vehicle body 2 at a high level from a road surface so as to secure a clearance between the front tank 20 and the road surface. Accordingly, the height of the vehicle body 2, i.e., the vehicle height of the gas tank-equipped vehicle 1 needs to be increased.

On the other hand, if the gas tank-equipped vehicle is configured to let the rear side of the front tank 20 drop in the event of collision as in the embodiment, the front tank 20 can be placed roughly at the same level as the rear tank 40. Thus, compared with the modified example shown in FIG. 14, the lower surface of the vehicle body 2 can be kept at a low level. Accordingly, it is not necessary to increase the height of the vehicle body 2, i.e., the vehicle height of the gas tank-equipped vehicle 1. Moreover, if the gas tank-equipped vehicle is configured to let the rear side of the front tank 20 drop in the event of collision as described above, the likelihood of the front tank 20 coming in contact with the rear tank 40 can be reduced. Furthermore, if the gas tank-equipped vehicle is configured to let the rear side of the front tank 20 drop in the event of collision, even when the front tank 20 comes in contact with the rear tank 40, the impact load applied to the rear tank 40 can be reduced.

Figure 15:
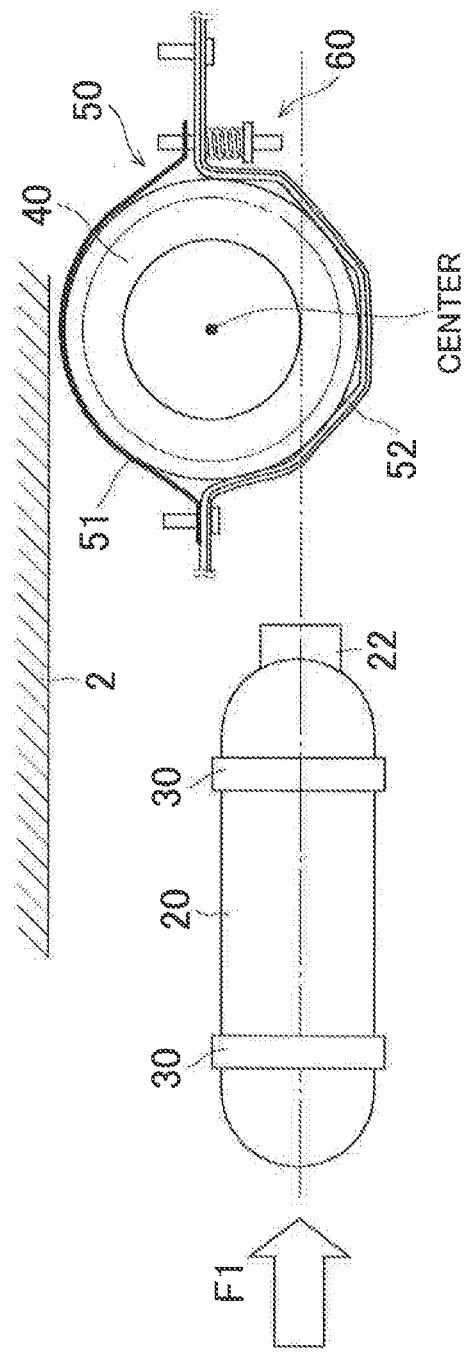
FIG. 15 is a view showing a layout of the front tank and the rear tank according to a second modified example.

FIG. 15 is a view showing a layout of the front tank 20 and the rear tank 40 according to a second modified example. In the example shown in FIG. 15, the diameter of the rear tank 40 is larger than the diameter of the front tank 20. The rear tank 40 can have a larger diameter than the front tank 20 for reasons of the relation with the occupant compartment 3 and the structure of the tire wheel house. Thus, if the front tank 20 and the rear tank 40 are disposed so that the lower sides of the front tank 20 and the rear tank 40 are at the same level from a road surface, the central axis of the front tank 20 is located at a lower level than the center of the rear tank 40. This layout allows the front tank 20 to come in contact with the lower side of the rear tank 40, without letting the rear side of the front tank 20 drop, when the load F1 is applied from the front side to the front tank 20. However, if the gas tank-equipped vehicle is configured to let the rear side of the front tank 20 drop in the event of collision as in the above embodiment, the likelihood of the front tank 20 coming in contact with the rear tank 40 can be reduced. Furthermore, if the gas tank-equipped vehicle is configured to let the rear side of the front tank 20 drop in the event of collision, even when the front tank 20 comes in contact with the rear tank 40, the impact load applied to the rear tank 40 can be reduced.

The elastic member of the coupling part 60 is the spring 62 in the above embodiment, but the elastic member does not have to be a spring, and any elastic body can be used instead. The spring 62 is provided on the lower side of the fixing plate 53 of the lower band 52 in the above embodiment, but the configuration of the spring 62 is not limited to this example. The spring 62 (elastic member) may be provided between the upper band 51 and the lower band 52. However, if the spring 62 is provided under the lower band 52, the upper band 51 can be coupled to the lower band 52 more reliably.

The fixing member 24 is a substantially L-shaped metal sheet in the above embodiment, but the configuration of the fixing member 24 is not limited to this example. The fixing member 24 may be any mechanism that does not release the front tank 20 in response to an inertial force of the front tank 20 but releases the front tank 20 in response to an impact load.

The rear tank mounting mechanism 43 has two tank bands 50 in the above embodiment, but the configuration of the rear tank mounting mechanism 43 is not limited to this example. The number of the tank bands 50 may be three or more. Similarly, the number of the tank bands 30 may be two or more.

What is claimed is:

1. A gas tank-equipped vehicle equipped with a plurality of gas tanks, the gas tank-equipped vehicle comprising:
   a vehicle body;
   a first gas tank disposed with a longitudinal direction of the first gas tank along a front-rear direction of the gas tank-equipped vehicle;
   a second gas tank that is disposed closer to the rear of the gas tank-equipped vehicle than the first gas tank is, and disposed with a longitudinal direction of the second gas tank along a left-right direction of the gas tank-equipped vehicle;
   a first mounting mechanism by which the first gas tank is mounted to the vehicle body; and
   a plurality of tank bands wound around the second gas tank to mount the second gas tank to the vehicle body, the tank band including:
      a lower band fixed to the vehicle body and supporting the second gas tank from a lower side in a direction of gravity;
      an upper band covering the second gas tank from a upper side in the direction of gravity; and
      a coupling part coupling together the lower band and the upper band on a rear side of the gas tank-equipped vehicle and having an expandable and contractable elastic member,
   the gas tank-equipped vehicle being configured to allow the first gas tank to come in contact with the lower side of the second gas tank when a load from a front side of the gas tank-equipped vehicle is applied to the first gas tank, and
   the gas tank-equipped vehicle being configured such that, when an impact of the first gas tank is applied to the lower side of the second gas tank, a rear side of the upper band in the front-rear direction of the gas tank-equipped vehicle moves upward due to deformation of the elastic member to increase a distance between the upper band and the lower band at the coupling part.

2. The gas tank-equipped vehicle according to claim 1, wherein the first mounting mechanism is configured such that, when the load larger than a predetermined load is applied from the front side of the gas tank-equipped vehicle to the first gas tank, a rear side of the first gas tank in the front-rear direction of the gas tank-equipped vehicle is released from fixation while a front side of the first gas tank in the front-rear direction of the gas tank-equipped vehicle remains supported.

3. The gas tank-equipped vehicle according to claim 1, wherein a rigidity of the upper band is lower than the rigidity of the lower band.

4. The gas tank-equipped vehicle according to claim 1, wherein the coupling part is configured such that the lower band and the upper band are released from the coupling of the coupling part when the rear side of the upper band in the front-rear direction of the gas tank-equipped vehicle moves upward beyond a predetermined value.

5. The gas tank-equipped vehicle according to claim 4, further comprising a frame that is disposed closer to the rear of the gas tank-equipped vehicle than the second gas tank is, wherein a rear side of the lower band in the front-rear direction of the gas tank-equipped vehicle projects toward the rear side of the gas tank-equipped vehicle, and the gas tank-equipped vehicle is configured to allow the rear side of the lower band in the front-rear direction of the gas tank-equipped vehicle to overlap a part of a front side of the frame in the front-rear direction of the gas tank-equipped vehicle when the vehicle body deforms so as to crush in the front-rear direction of the gas tank-equipped vehicle.

6. The gas tank-equipped vehicle according to claim 5, wherein a length of the frame in the left-right direction is shorter than a length of the second gas tank in the longitudinal direction.

7. The gas tank-equipped vehicle according to claim 5, wherein an interval between an adjacent tank bands is shorter than a length of the frame in the left-right direction.

8. The gas tank-equipped vehicle according to claim 1, wherein a lower surface of the vehicle body is curved so as to circumvent the first gas tank and the second gas tank.

* * * * *